(12) United States Patent
Wainner et al.

(10) Patent No.: US 7,720,995 B2
(45) Date of Patent: May 18, 2010

(54) CONDITIONAL BGP ADVERTISING FOR DYNAMIC GROUP VPN (DGVPN) CLIENTS

(75) Inventors: W. Scott Wainner, Potomac Falls, VA (US); James N. Guichard, New Boston, NH (US)

(73) Assignee: Cisco Technology, Inc., San Jose, CA (US)

( * ) Notice: Subject to any disclaimer, the term of this patent is extended or adjusted under 35 U.S.C. 154(b) by 292 days.

(21) Appl. No.: 11/811,381

(22) Filed: Jun. 8, 2007

(65) Prior Publication Data

US 2008/0307110 A1 Dec. 11, 2008

(51) Int. Cl.
G06F 15/173 (2006.01)
G06F 7/04 (2006.01)
H04L 12/56 (2006.01)

(52) U.S. Cl. .......................... 709/242; 370/400; 726/3
(58) Field of Classification Search ............ 379/112.01; 707/2, 8, 201; 709/225, 227, 238, 244, 249; 713/155, 163, 169, 171; 726/1, 5, 6, 14, 726/15, 18, 27; 370/392, 400, 401
See application file for complete search history.

(56) References Cited

U.S. PATENT DOCUMENTS

| | | | |
|---|---|---|---|
| 6,038,322 A | 3/2000 | Harkins | |
| 6,215,878 B1 | 4/2001 | Harkins | |
| 6,484,257 B1 | 11/2002 | Ellis | |
| 6,590,885 B1 | 7/2003 | Jorgensen | |
| 6,611,872 B1 | 8/2003 | McCanne | |
| 6,678,828 B1 | 1/2004 | Pham et al. | |
| 6,680,922 B1 | 1/2004 | Jorgensen | |
| 6,704,795 B1 * | 3/2004 | Fernando et al. ............ 709/237 |
| 6,789,118 B1 | 9/2004 | Rao | |
| 6,798,782 B1 | 9/2004 | Caronni et al. | |
| 6,826,616 B2 | 11/2004 | Larson et al. | |
| 6,839,759 B2 | 1/2005 | Larson et al. | |
| 7,139,838 B1 * | 11/2006 | Squire et al. ................ 709/242 |
| 7,359,393 B1 * | 4/2008 | Nalawade et al. ............ 370/401 |
| 7,558,877 B1 * | 7/2009 | Fedyk et al. ................ 709/242 |
| 2002/0188871 A1 | 12/2002 | Noehring et al. | |
| 2003/0188159 A1 * | 10/2003 | Josset et al. .................. 713/163 |
| 2003/0191937 A1 * | 10/2003 | Balissat et al. .............. 713/163 |
| 2004/0001497 A1 * | 1/2004 | Sharma ....................... 370/401 |
| 2004/0042596 A1 * | 3/2004 | Kim et al. .............. 379/112.01 |
| 2006/0164995 A1 * | 7/2006 | Djernaes et al. ............. 370/238 |
| 2006/0184999 A1 | 8/2006 | Guichard et al. | |

(Continued)

OTHER PUBLICATIONS

RFC: 3547 "The Group Domain of Interpretation" Jul. 2003 Baugher et al.*

(Continued)

*Primary Examiner*—Wing F Chan
*Assistant Examiner*—Jonathan Willis
(74) *Attorney, Agent, or Firm*—Bainwood Huang

(57) ABSTRACT

In a host within a group, a method for ensuring secure communications is provided. The method involves (a) determining if a group security policy is in place for secure communication between hosts within the group, (b) if the group security policy is in place, advertising routing information to another host within the group, and (c) if the group security policy is not in place, refraining from advertising routing information to the other host. Corresponding apparatus and computer program product embodiments are also provided.

12 Claims, 3 Drawing Sheets

U.S. PATENT DOCUMENTS

2006/0198368 A1    9/2006  Guichard et al.
2007/0083923 A1    4/2007  Fluhrer et al.
2007/0248225 A1   10/2007  Fluhrer
2007/0258376 A1*  11/2007  Li .............................. 370/238
2008/0010242 A1*   1/2008  Jin et al. ........................ 707/2
2008/0080509 A1*   4/2008  Khanna et al. .............. 370/392

OTHER PUBLICATIONS

RFC: 2362 "Protocol Independent Multicast-Sparse Mode (PIM-SM): Protocol Specification" Jun. 1998 Estrin et al.*
Wainner, W. Scott, System and Method for Dynamic Secured Group Communication, U.S. Appl. No. 10/867,266, filed Jun. 14, 2004.

* cited by examiner

CONDITIONAL BGP ADVERTISING FOR DYNAMIC GROUP VPN (DGVPN) CLIENTS

TECHNICAL FIELD

The present disclosure relates generally to computer networking.

BACKGROUND

Virtual Private Networks (VPNs) provide a partitioning mechanism for isolating data transmitted and received between customer network nodes even though a corresponding physical network supporting propagation of the data is shared by many users. The data transmitted between such network nodes may be encrypted to protect against eavesdropping and tampering by unauthorized parties. A typical VPN may include a group, composed of network nodes in several subnets.

In one conventional system, when network nodes within the same group, but in different subnets wish to communicate, the network nodes (or their respective subnet routers) establish a point-to-point secure connection by negotiating a pairwise key for the communication. However, because establishing a pairwise key can require substantial computational resources, a Dynamic Group VPN (DGVPN) may be used instead. With a DGVPN, when network nodes which are members of the same group wish to communicate, no pairwise key is required. Instead, the two network nodes use a shared group key in order to communicate encrypted data. In this approach, a shared key server provides group security policies to nodes within particular groups. When a first network node wishes to communicate with a second node, both nodes being in a shared group, each node should have the group security policy from the shared key server. The security policy includes a group ID, a set of subnet prefixes identifying members of the group, and a group key. When the first node communicates with the second node, the first node determines if the first and the second node are in a shared group, by determining if there is a group ID in its routing table corresponding to the subnet prefix of the second node. If the two nodes are in a common group, the first node encrypts communications to the second node using the group key associated with the group ID. The two nodes may then communicate using that group key. A technique similar to this latter approach is described in co-pending U.S. patent application Ser. No. 10/867,266 (Wainner, et al.), filed Jun. 14, 2004, entitled "System and method for Dynamic Secured Group Communication."

BRIEF DESCRIPTION OF THE DRAWINGS

Objects, features, and advantages of particular embodiments of the invention will be apparent from the following description, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Figure 1:
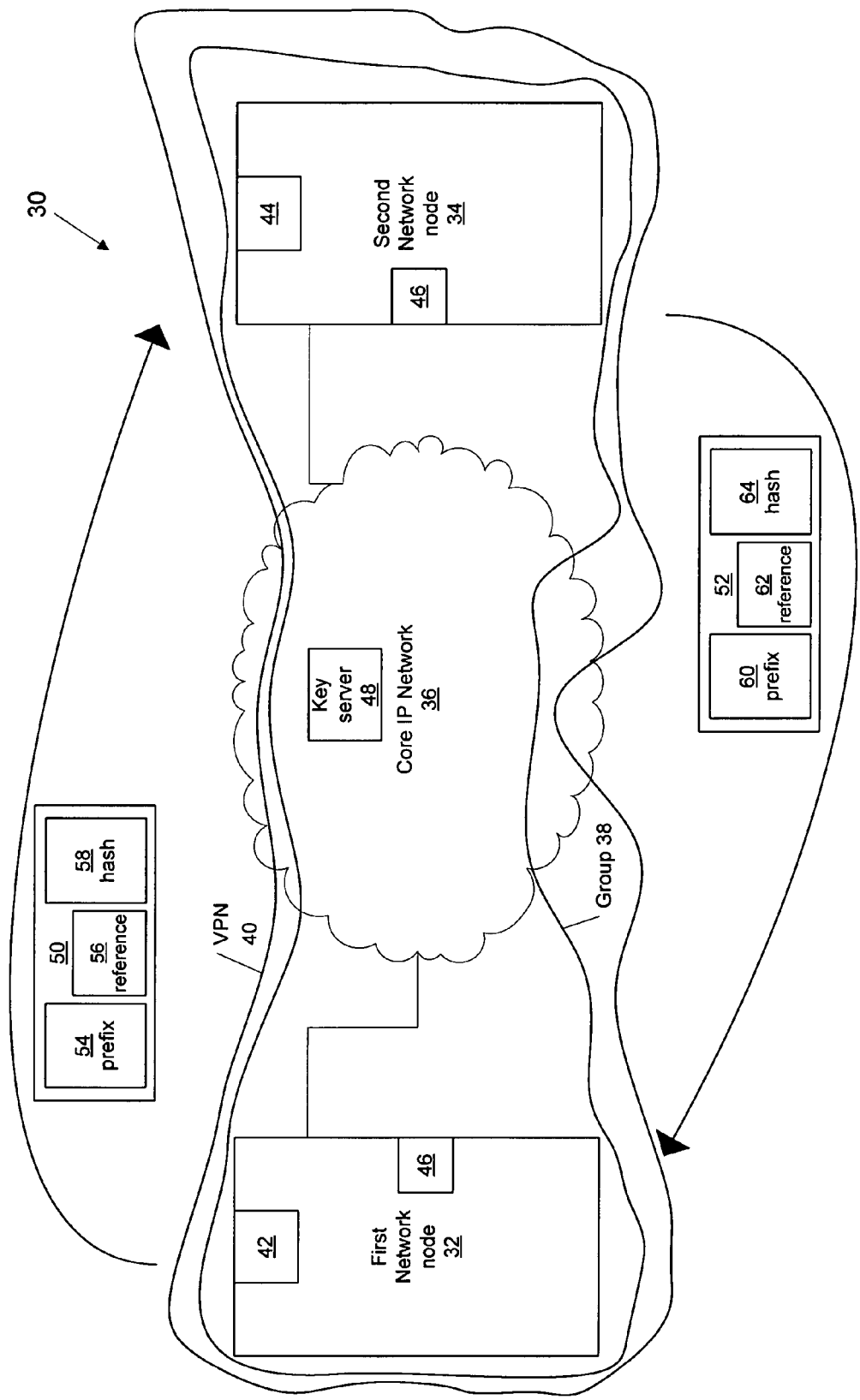
FIG. 1 illustrates a network configuration used by embodiments of the invention.

Unfortunately, the conventional DGVPN approach has some deficiencies in that there may be an asymmetry in the encryption states of the communicating network nodes. For example, if a first node has obtained the encryption state from the key server, but a second node is unable to do so, then the first node may send encrypted packets to the second node, which the second node is not able to decrypt, thereby wasting network resources. Also, in the situation that the second node is not able to obtain the encryption state, the second node may send unencrypted packets to the first node, thereby violating the security policy. Finally, even in a situation in which both nodes have obtained the encryption state, it is possible that the first node may not have received a routing update from the second node in another subnet. In that situation, no communication would be established.

An improved technique solves these deficiencies by using conditional advertisement of routing prefixes and conditional acceptance of routing prefixes in order to synchronize the encryption and routing states of two network hosts wishing to communicate. In one embodiment, routing information is only advertised if a security policy is in place within a network node. In addition, in another embodiment, received routing updates are only written into the node's routing table if the received routing update includes a reference to the proper security policy. In another embodiment, communication between the nodes only occurs once the routing information and security policy information has been properly distributed. In another embodiment, the routing advertisement includes a hash. Embodiments are also provided for apparatus and computer program products for practicing the invention.

Description of Example Embodiments

An improved technique involves conditional route advertising. The route advertising is conditional on establishing a symmetric security policy within group members of a DGVPN. The group members wishing to communicate synchronize their routing states with their crypto-states. If the crypto-states do not synchronize, then the routing states do not synchronize either, and no communication is possible between the group members over a secure DGVPN. This may be referred to as a fail-close state. As a result, no communication is attempted unless both group members have a security policy in place.

A Standard DGVPN

In a DGVPN, groups are set up to allow for encrypted communications between subnets of the VPN. Typically, communications within each subnet is trusted, so the DGVPN is implemented at the routers controlling each subnet. These edge routers are referred to as network nodes. When a first computer in a first subnet wishes to communicate with a second computer in a second subnet, the communication will travel through the respective routers of each subnet. When the router of the first subnet (hereinafter, the first network node) receives the communication, it will determine the subnet prefix of the router of the second subnet (hereinafter, the second network node). If the second network node is part of a DGVPN group in common with the first network node (as determined by reference to a routing table), then secured communication between the first and second network nodes is possible by using a shared group key, provided by a key server. If the two network nodes are not within a common DGVPN group, then secure communication is not possible between the two nodes by means of a shared group key, in which case either unsecured communication must occur, or some other method of secured communication must be utilized.

In order to set up a DGVPN group, a network node, known as a group initiator, identifies a plurality of additional network nodes as members of the group. This involves sending a request to a key server with a list of the subnet prefixes of each of those network nodes. The key server responds by assigning a group ID and a group key to the group identified by the provided subnet prefixes. The key server also provides an authentication mechanism. The group initiator updates its routing table to indicate that the subnet prefixes indicate the group having the group ID. The group initiator also propagates the group ID and the list of subnet prefixes to all the network nodes within the group. Each network node within the group may then contact the key server with the group ID, be authenticated, and receive the group key. This group key is used for secured communications between the network nodes of the DGVPN group.

Thus, when the first computer wishes to communicate with the second computer, the network packet sent to the second computer is received at the first network node. The first network node looks up the subnet prefix of the second computer in its routing table (by examining the destination field of the packet) and determines if the subnet prefix is associated with a group ID in its routing table. If it is, the first network node looks up the group key corresponding to that group ID and encrypts the contents of the packet with that key. The packet is then forwarded on to the second network node according to standard routing protocols. Upon receiving the encrypted packet, the second network node looks up the subnet prefix of the source field of the packet in its routing table to determine if it is from a DGVPN group member, and if so, what the group ID is. Once the group ID is identified, the second network node may decrypt the contents of the packet by using the group key for the group.

An Improved DGVPN

The DGVPN as described above, may suffer from a deficiency if one of the network nodes has not yet received the group information (e.g., the group ID, the subnet prefixes, or the group key). Once a network node has received this information, updated its routing table to reflect the correspondence between subnet prefixes and the group ID, and established a correspondence between the group ID and the group key, the network node is said to have a group security policy in place.

FIG. 1 illustrates an example system 30, which is constructed and arranged to carry out conditional route advertising. The system includes a first network node 32, a second network node 34, and a core IP network 36. The core IP network 36 is a layer 3 network which rests on top of a collection of connected layer 2 networks. Thus, the core IP network 36 typically contains hubs, switches, routers, servers, and various other network devices. The core IP network 36, may be, for example, a corporate intranet. The two network nodes 32 and 34 are both members of a single DGVPN group 38 within a virtual private network (VPN) 40. Each network node 32, 34 is typically a router on the network. Each network node 32, 34 operates a conditional BGP (Border Gateway Protocol) routing process 42, 44 and contains a reserved location 46 to store a group security policy. The IP core network 36 contains a key server 48. The network nodes 32, 34, when desiring to communicate with each other over the VPN 40, will exchange routing updates 50, 52. The first network node 32 sends a first routing update 50 across the IP core network 36 to the second network node 34. The second network node 34 sends a second routing update 52 across the IP core network 36 to the first network node 32.

Figure 2:
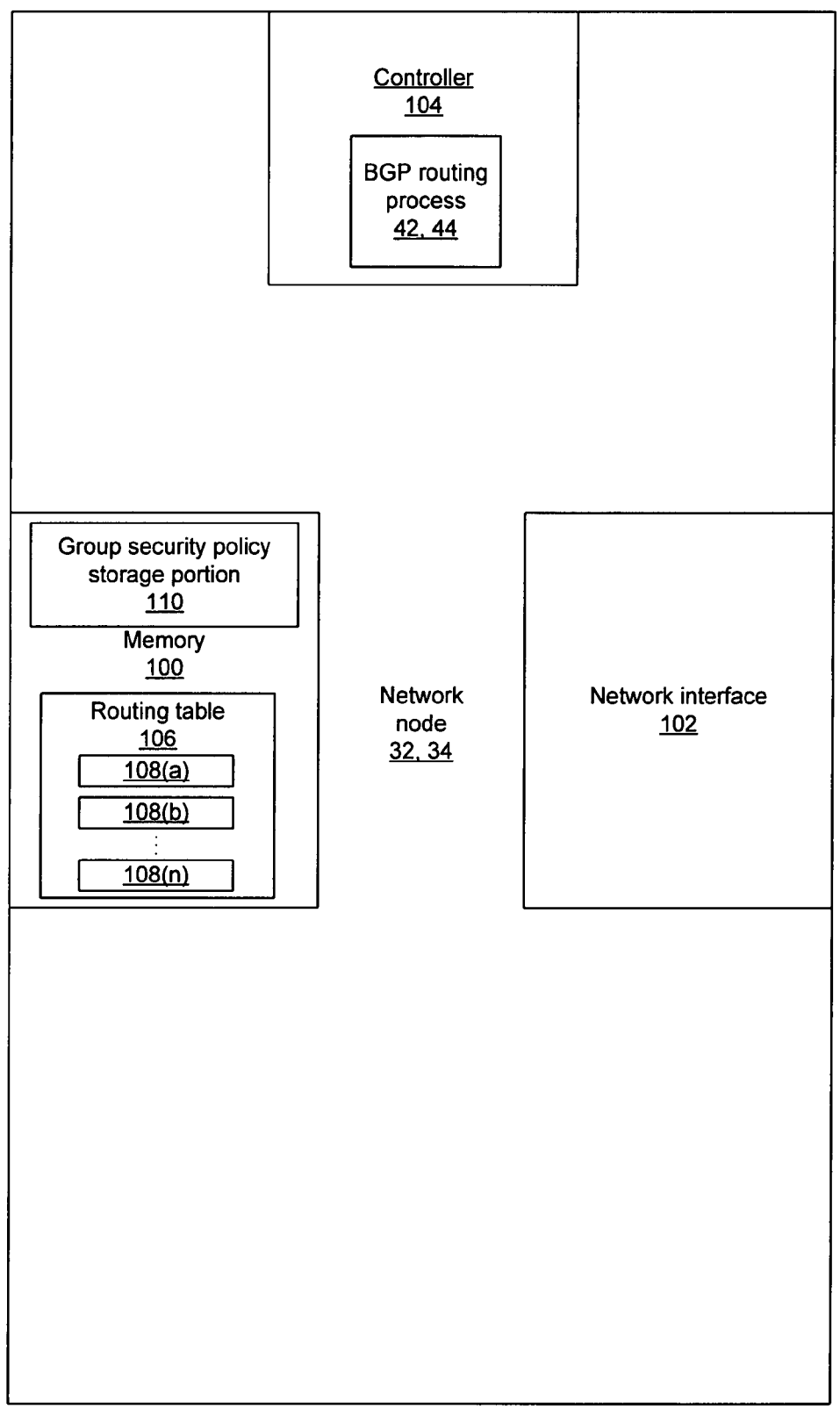
FIG. 2 illustrates an example embodiment of the invention.

FIG. 2 illustrates an example network node 32, 34. Each network node 32, 34 contains memory 100, a network interface 102, and a controller 104. The controller 104 contains a conditional BGP routing process 42, 44. The memory 100 includes a routing table 106, having multiple entries 108(a), 108(b), . . . , 108(n) (generally routing entries 108). The memory also includes a portion 110 in which a group security policy may be stored.

The illustrated system is desirable to use in order to establish communications between network nodes 32, 34 both residing within the same DGVPN group 38 of a VPN 40. The arrangement, as hereinbelow described, allows for secure communication to occur between members of the group 38, while preventing insecure communication. During operation, each network node 32, 34 performs a procedure 200 in order to communicate.

Figure 3:
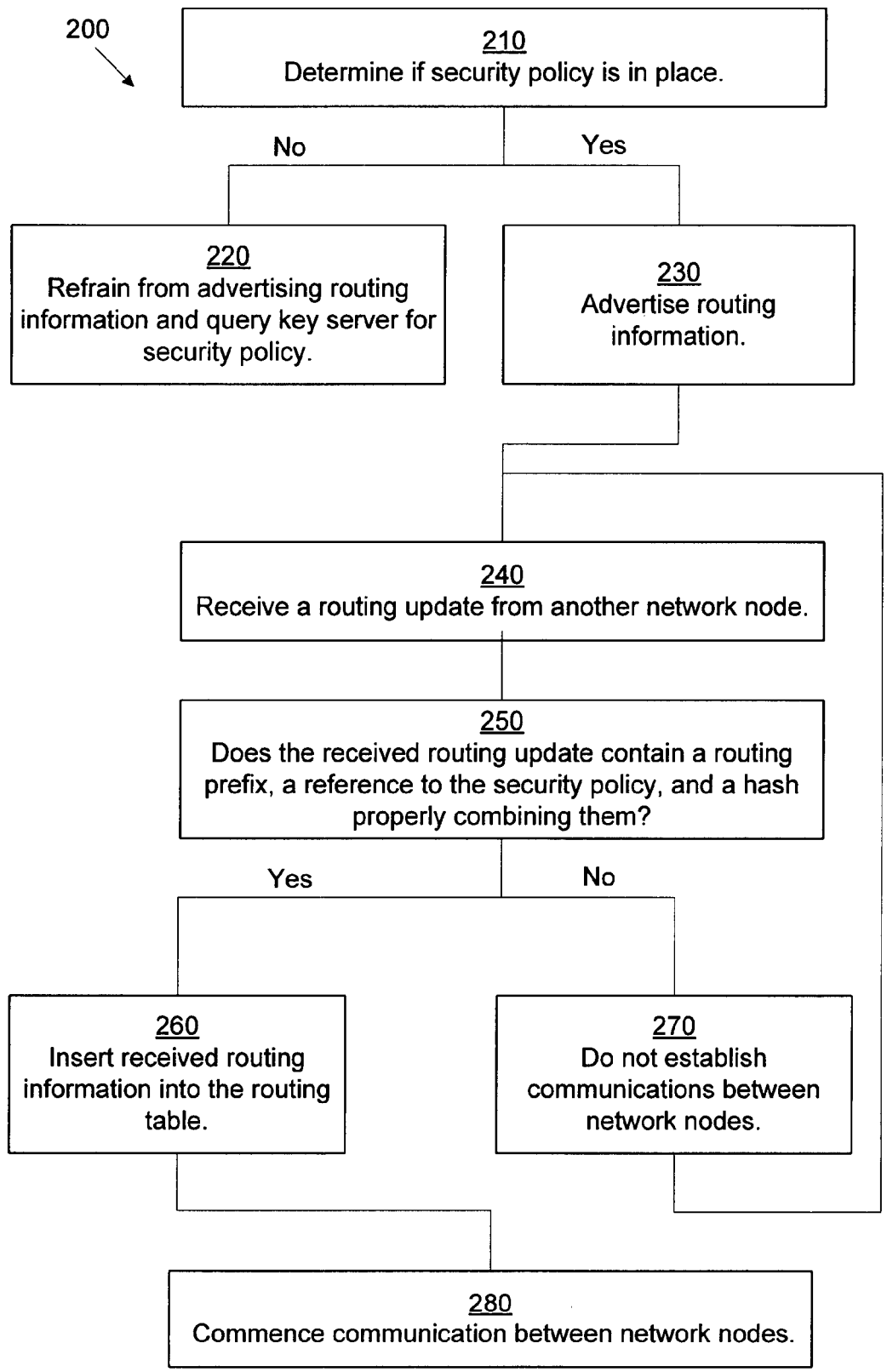
FIG. 3 is a flowchart that illustrates an example embodiment of the invention.

FIG. 3 is a flowchart of the procedure 200 which is performed by a network node of the system 30, for example the first network node 32. In step 210, the first network node determines if a group security policy is in place, by checking portion 110 within memory 100. If the group security policy is not in place, the first network node 32 refrains from advertising routing information 50 and queries the key server 48 to obtain the group security policy (step 220). Contact with the key server 48, may, for example, take place according to the GDOI protocol, described in "RFC 3547—The Group Domain of Interpretation" by M. Baugher et al. (2003). The method 200 then proceeds back to step 210, operating in a loop until a group security policy is in place.

The group security policy is a collection of information, including keys, ipsec proxies, lifetimes, algorithms, etc. The group security policy also contains a group reference, which identifies a specific policy. The group reference (or group ID) can be an abstract number or string. An example group security policy might look like the following:
  Security policy
  Tunnel mode
  Source: 10.1.0.0/16
  Destination: 10.1.0.0/16
  Algorithm: aes
  Lifetime: 3600
  Key: 12345
  Reference: 1111

Once a group security policy is in place, the method 200 proceeds to step 230. In step 230, the first network node 32 advertises routing information 50 across the network 36 according to the BGP protocol. The BGP protocol is described in "RFC 1771—A Border Gateway Protocol 4 (BGP 4)" by Y. Rekhter, et al. (1995). The routing information 50 includes a routing prefix 54, a group reference 56 (indicating that the first network node 32 has obtained the group security policy), and a hash 58, cryptographically combining the routing prefix 54 and the group reference 56. This is done, for example, by concatenating the routing prefix 54 with the group ID 56, and hashing the result using a pre-defined cryptographic hashing algorithm as is well-understood in the art. In step 240, the first network node 32 receives a corresponding routing update 52 from the second network node 34, with which communication is desired over VPN 40. If the routing update 52 from the second network node 34 contains a routing prefix 60, a group reference 62 (indicating that the second network node 34 has obtained the group security policy) corresponding to the group security policy stored in location 110 of memory 100 (which will only be in place if the first network node 32 has the group security policy in place), and a cryptographic hash 64 which properly combines the second routing prefix 60 and the group reference 62 (step 250), then the first network node 32 accepts the routing information 52 and inserts it into an entry 108 within the routing table 106, within memory 100 (step 260). Otherwise, either the second network node 34 has not provided a proper routing prefix 60 or the second network node has not properly confirmed that it possesses the proper group security policy for group communication over the VPN 40. In that case, communication between the network nodes 32, 34 is not established over the VPN 40 (step 270). The method may then loop back to step 240 until proper routing information is received. In step 280, communication commences between network nodes 32, 34 using the security policy over VPN 40.

The second network node 34 also performs the method 200. It should be understood, that either network node 32, 34 may initiate communications. If the first node 32 initiates communications, it will first make sure that the security policy is in place locally, and if not, it will query the key server 48. Only then will it send routing information across the network so that the second node 34 will know how to contact it. Upon receiving the routing information from the first node 32, the second node 34 checks the packet 50 to make sure that it includes a group reference 56 and a routing prefix 54. It also makes sure that these are properly hashed together 58, so as to avoid spoofing. If the second node 34 does not yet have a security policy in place, it should query the key server 48 at this time to obtain the security policy associated with the group reference 56. The second node 34 then inserts the routing information into its routing table 106 and sends back its own routing information in a similar packet 52.

Thus, the system 30 and method 200 are effective to prevent communications from occurring between the network nodes 32, 34 except while encrypted. They are also effective to ensure that communications only occurs once each node 32, 34 knows how to reach the other node across the network.

While various embodiments of the invention have been particularly shown and described, it will be understood by those skilled in the art that various changes in form and details may be made therein without departing from the spirit and scope of the invention as defined by the appended claims.

For example, embodiments have been described as including a hash 58, 64 in a routing update 50, 52. However, if the routing update is encrypted according to the group security policy 46, the hash 58, 64 may be omitted.

As an additional example, embodiments have been described as operating over a VPN on an IP network. However, the invention may also be applied over other forms of virtual networks operating over other forms of physical networks or collections thereof. Similarly, embodiments have been described as operating according to the BGP protocol, but the invention may also be applied over a different routing protocol.

In addition, it should be understood that a network node may also be described as a network host, both terms referring to network devices capable of communicating with each other over a VPN over an IP network.

In addition, it should be understood that embodiments may also be directed to a computer program product comprising a computer-readable medium (such as memory 100) having computer readable instructions recorded thereon for establishing secure communication between network hosts 32, 34 within a group 38, the computer readable instructions being operative, when performed by a computerized device (such as, for example network nodes 32, 34), to cause the computerized device to perform a method as described above. A computer-readable medium is a tangible data storage medium which is readable by a computer that is capable of storing executable program code. Examples of a computer-readable medium may include a magnetic disk (such as a hard disk or a floppy disk), an optical disc (such as a CD, DVD or Bluray disc), magnetic tape, or electromagnetic memory (such as flash memory, ROM, or RAM).

What is claimed is:

1. A method, performed by a first host to determine if communication with a second host is allowed within a group of at least two hosts, comprising:

determining, at the first host, if the host includes a group security policy for secure communication between the hosts within the group, wherein:

wherein the first host controls a first subnet, the first subnet being part of the group; and the second host controls a second subnet, the second subnet being part of the group;

advertising routing information from the first host to a second host within the group if the first host includes the group security policy, wherein advertising routing information includes:

providing an advertisement message including:

a routing prefix, identifying the first subnet;

a group reference identifying the group security policy; and a hash combining the routing prefix with the reference;

encrypting the advertisement message using the group security policy; and sending the encrypted advertisement message to the second host;

refraining from advertising routing information from the first host to the second host if the first host does not include the group security policy;

receiving, at the first host, a routing announcement from the second host, including routing information;

if the routing announcement from the second host includes a second group reference identifying the group security policy, placing the routing information within a routing table contained in the first host; and if the routing announcement from the second host does not include the second group reference identifying the group security policy, refraining from placing the routing information within the routing table for the first host.

2. The method of claim 1:

wherein the routing announcement from the second host includes:

a second routing prefix;

the second group reference identifying the group security policy; and a second hash combining the second routing prefix with the second group reference; and wherein placing the routing information within the routing table includes:

determining if the second group reference, received from the second host, references the same group security policy as provided by the key server; and confirming that the second hash is properly formed from the second routing prefix and the second group reference.

3. The method of claim 1 wherein the method further comprises:
    requesting the group security policy from a key server, the key server providing the same group security policy to all hosts within the group.
4. The method of claim 1 wherein the method further comprises communicating with the second host if and only if:
    the first host includes the group security policy; and
    the routing information for the second host has been placed within the routing table of the first host.
5. An apparatus comprising:
    memory, the memory including a routing table;
    a network interface, the network interface for connecting to hosts, the apparatus and a subset of the hosts forming a group; and
    a controller, coupled to the memory and the network interface, the controller configured to:
    determine if the apparatus includes a group security policy for secure communication between the hosts within the group, wherein:
        the apparatus controls a first subnet, the first subnet being part of the group; and
        at least one of the hosts within the group controls a second subnet, the second subnets being part of the group;
    advertise routing information to the at least one of the hosts within the group if the apparatus includes the group security policy, wherein advertising routing information includes:
        providing an advertisement message including:
            a routing prefix, identifying the first subnet;
            a group reference identifying the group security policy; and
            a hash combining the routing prefix with the reference;
        encrypting the advertisement message using the group security policy, and
        sending the encrypted advertisement message to the at least one of the hosts within the group;
    refrain from advertising routing information to the at least one of the hosts within the group if the apparatus does not include a group security policy;
    receive a routing announcement from the at least one of the hosts within the group, including routing information;
    if the routing announcement from the at least one of the hosts within the group includes a second group reference identifying the group security policy, place the routing information within the routing table; and
    if the routing announcement from the at least one of the hosts within the group does not include the second group reference identifying the group security policy, refrain from placing the routing information within the routing table.
6. The method of claim 5 wherein:
    the routing announcement from the at least one the hosts within the group includes:
        a second routing prefix;
        the second group reference identifying the group security policy; and
        a second hash combining the second routing prefix with the second group reference; and
    when placing the routing information within the routing table the controller is configured to:
        determine if the second reference, received from the at least one the hosts within the group, references the same group security policy as the group security policy in place, included within the apparatus; and
        confirm that the second hash is properly formed from the second routing prefix and the second group reference.
7. The apparatus of claim 5 wherein the controller is further configured to:
    request the group security policy from a key server, the key server providing the same group security policy to all of the hosts within the group.
8. The apparatus of claim 5 wherein the controller is further configured to communicate with the at least one of the hosts within the group if and only if:
    the group security policy is in place; and
    the routing information for at least one of the hosts within the group has been placed within the routing table.
9. A computer program product comprising a computer-readable medium having computer readable instructions recorded thereon for establishing secure communication between hosts within a group, the computer readable instructions being operative, when performed by a computerized device, to cause the computerized device to:
    determine if the computerized device includes a group security policy for secure communication between the hosts within the group, wherein:
        the computerized device controls a first subnet, the first subnet being part of the group; and
        at least one of the hosts within the group controls a second subnet, the second subnet being part of the group;
    advertise routing information to the at least one of the hosts within the group if the computerized device includes the group security policy,
    wherein advertising routing information includes:
        providing an advertisement message including:
            a routing prefix, identifying the first subnet;
            a group reference identifying the group security policy; and
            a hash combining the routing prefix with the reference;
        encrypting the advertisement message using the group security policy, and
        sending the encrypted advertisement message to the at least one of the hosts within the group;
    refrain from advertising routing information to the at least one of the hosts within the group if the computerized device does not include a group security policy;
    receive a routing announcement from the at least one of the hosts within the group, including routing information;
    place the routing information within a routing table of the computerized device if the routing announcement from the at least one of the hosts within the group includes a second group reference identifying the group security policy;
    refrain from placing the routing information within the routing table if the routing announcement from the at least one of the hosts within the group does not include a second group reference identifying the group security policy.
10. The computer program product of claim 9 wherein:
    the routing announcement from the at least one of the hosts within the group includes:
        a second routing prefix;
        the second group reference identifying the group security policy; and
        a second hash combining the second routing prefix with the second group reference; and
    when placing the routing information within the routing table, the computer readable instructions are operative, when performed by the computerized device, to cause the computerized device to:

determine if the second group reference, received from the at least one of the hosts within the group, references the same group security policy as the group security policy in place, for secure communication between the at least one of the hosts within the group; and confirm that the second hash is properly formed from the second routing prefix and the second group reference.

11. The computer program product of claim 9 wherein the computer readable instructions are further operative, when performed by the computerized device, to cause the computerized device to:

request the group security policy from a key server, the key server providing the same group security policy to all of the hosts within the group.

12. The computer program product of claim 9 wherein the computer readable instructions are further operative, when performed by the computerized device, to cause the computerized device to communicate with the at least one of the hosts within the group if and only if:

the group security policy is in place; and the routing information for the at least one of the hosts within the group has been placed within the routing table.

* * * * *

UNITED STATES PATENT AND TRADEMARK OFFICE
CERTIFICATE OF CORRECTION

| | | |
|---|---|---|
| PATENT NO. | : 7,720,995 B2 | Page 1 of 1 |
| APPLICATION NO. | : 11/811381 | |
| DATED | : May 18, 2010 | |
| INVENTOR(S) | : W. Scott Wainner et al. | |

It is certified that error appears in the above-identified patent and that said Letters Patent is hereby corrected as shown below:

Claim 1, Column 6, Line 17, "determining, at the first host, if the host includes a group" should read -- determining, at the first host, if the first host includes a group --.

Claim 1, Column 6, Line 20, "wherein the first host controls a first subnet, the first" should read -- the first host controls a first subnet, the first --.

Claim 2, Column 6, Lines 62-63, "from the second host, references the same gorup security policy as provided by the key server; and" should read -- from the second host, references the same group security policy as provided by a key server; and --.

Claim 5, Column 7, Line 24, "second subnet, the second subnets being part of the" should read -- second subnet, the second subnet being part of the --.

Claim 6, Column 7, Line 54, "The method of claim 5 wherein:" should read -- The apparatus of claim 5 wherein: --.

Claim 6, Column 7, Line 55, "the routing announcement from the at least one the hosts" should read -- the routing announcement from the at least one of the hosts --.

Claim 6, Column 7, Lines 64-65, "determine if the second reference, received from the at least one the hosts within the group, referenes the" should read -- determine if the second group reference, received from the at least one of the hosts within the group, references the --.

Claim 12, Column 10, Line 8, "within the group if and only if:" should read -- if and only if: --.

Signed and Sealed this

Twenty-ninth Day of June, 2010

David J. Kappos
*Director of the United States Patent and Trademark Office*